(12) United States Patent
Longacre, Jr. et al.

(10) Patent No.: US 6,298,175 B1
(45) Date of Patent: *Oct. 2, 2001

(54) OBJECT SENSOR SYSTEM COMPRISING CONTROLLED LIGHT SOURCE

(75) Inventors: Andrew Longacre, Jr., Skaneateles; Robert M. Husssey, Liverpool, both of NY (US)

(73) Assignee: Welch Allyn Data Collection, Inc., Skaneateles Falls, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,191

(22) Filed: Oct. 17, 1997

(51) Int. Cl.[7] ................ G06K 9/20; G06K 9/22
(52) U.S. Cl. ............................ 382/312; 382/313
(58) Field of Search ................. 382/312, 313, 382/314, 315, 316, 317, 318, 319, 321, 322, 323, 324; 315/82, 159; 307/10.8, 121; 235/462.48, 472.02, 462.47, 462.34, 462.45, 455; 361/683, 729, 731, 814; 364/708.1; 455/90, 348; 318/457; 340/429; 358/464, 447, 471

(56) References Cited

U.S. PATENT DOCUMENTS

| | | | |
|---|---|---|---|
| 4,882,629 | * 11/1989 | Faulkerson et al. | 358/464 |
| 5,039,847 | 8/1991 | Morii et al. | 235/379 |
| 5,268,564 | * 12/1993 | Metlitsky et al. | 235/462 |
| 5,410,141 | * 4/1995 | Koenck et al. | 235/472 |
| 5,513,017 | 4/1996 | Knodt et al. | 358/471 |
| 5,537,003 | * 7/1996 | Bechtel et al. | 315/82 |
| 5,550,366 | * 8/1996 | Roustaei | 235/462 |
| 5,557,091 | 9/1996 | Krummel | 235/462 |

\* cited by examiner

*Primary Examiner*—Jose L. Couso
*Assistant Examiner*—Duy M. Dang
(74) *Attorney, Agent, or Firm*—Wall Marjama & Bilinski

(57) ABSTRACT

This relates to a system for sensing the presence of an object in the field of view of an imaging assembly of a stationary position optical reader. The system includes a light source disposed in a field of view of the imaging assembly, which is configured to emit light in the direction of the imaging assembly according to a predetermined light pattern. A determination as to whether an object is present in a presentation area of the reader system is made by detecting for the presence of the light pattern in image information generated by the imaging assembly.

17 Claims, 4 Drawing Sheets

OBJECT SENSOR SYSTEM COMPRISING CONTROLLED LIGHT SOURCE

BACKGROUND OF THE INVENTION

1. Field of the Invention

The invention relates generally to stationary position type optical readers and particularly to an object sensing system for a stationary position type optical reader.

2. Background of the Prior Art

Many available stationary position optical readers, typically termed "presentation scanners" are configured to operate in a continuous scan mode; that is they continuously capture and attempt to decode bar code symbols without regard to whether a symbol-bearing substrate is in the field of view.

A continuous scan operating configuration requires repetitive illumination flashing of an LED array in the case of an image sensor based optical reader and repetitive laser scanning in the case of a laser scan engine based optical reader. Repetitive flashing illumination or laser scanning requires a high level of energy consumption and can result in premature component degradation. Furthermore, the repetitive illumination or laser scanning has been observed to be highly distracting to users of such optical readers configured to continuously scan image data.

U.S. Pat. No. 5,550,366 describes a system for automatically activating image scanning in a portable bar code reader when the presence of a bar code in a target area is detected. However, the detection of a bar code in the target area is carried out on a period basis and requires activation of a high radiance source of illumination. Accordingly, the system is not responsive in real time to an object being moved into the field of view of the reader, and the high radiance illumination required for operation of the system remains a source of distraction.

There is a need for a fixed position optical reader which automatically reads indicia on objects presented to the reader without continuously scanning images when objects are not present in the field of view of the reader's imaging assembly.

SUMMARY OF THE INVENTION

According to its major aspects and broadly stated the present invention is a stationary position optical reader having incorporated therein a sensor system for sensing the presence of an object in the field of view of the optical reader.

Optical readers of the type in which the present invention may be incorporated include an imaging assembly which is directed toward a stationary target location. The imaging assembly may be image sensor based or laser scan engine based and may be adapted to capture images in 1 or 2 dimensions.

The system of the invention includes an optical reader specially configured for use in the system including an imaging assembly, and a light source positioned opposite the imaging assembly so that the light source directs light toward the imaging assembly.

A presentation area is defined between the imaging assembly of the reader and the light source. When an object, such as a symbol-bearing substrate is presented to the presentation area, the imaging assembly's view of the light source is blocked, thereby decreasing the amount of light received by the imaging assembly from the light source.

According to the invention, light generated by the light source is caused to be emitted according to a predetermined pattern or timing sequence. In one embodiment, light is caused to be selectively emitted by the light source during alternating image data frame capture periods of the reader.

The image data that is captured by the reader will reveal the predetermined pattern of light emitted by the light source in the case that there is no object in the presentation area defined by the light source. However, if an object is present in the presentation area then light emitted the light source will be at least partially blocked by the object, and consequently the image data capture will not reveal the pattern of light emitted by the light source to the same extent (if at all) that the image data reveals the pattern when there is no object in the presentation area.

The reader of the invention is configured to sense the presence of an object in the presentation area by detecting for the light pattern emitted by the light source. If the pattern is detected, then the condition is indicated that no object is present in the presentation area. If the pattern is not detected, then the condition is indicated that an object is present in the presentation area.

Operation of the reader is made responsive to the detection of a light pattern. If the reader does not detect the predetermined pattern of light emitted from the light source (indicating the condition that an object is present in the presentation area) then the reader is made to operate in an active operating state wherein the illumination source of the reader illuminates scenes at standard radiance illumination and executes a decoding algorithm wherein the reader attempts to decode for any unknown symbol which may be in the field of view. If the reader does detect the predetermined pattern of light emitted by the light source (indicating the condition that an object is not in the presentation area) the reader is made to operate in an inactive operating state. In an inactive operating state, the reader's illumination source may be deenergized, and the full scale decoding algorithm executed during the active operating state may be deactivated.

The detection light source of the system which emits light according to a predetermined pattern emits light of lower radiance than that emitted by the reader's illumination source during an active operating state. Accordingly, the system does not emit potentially distracting high radiance light when there is no object in the presentation area.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF THE PREFERRED EMBODIMENT

Figure 1:
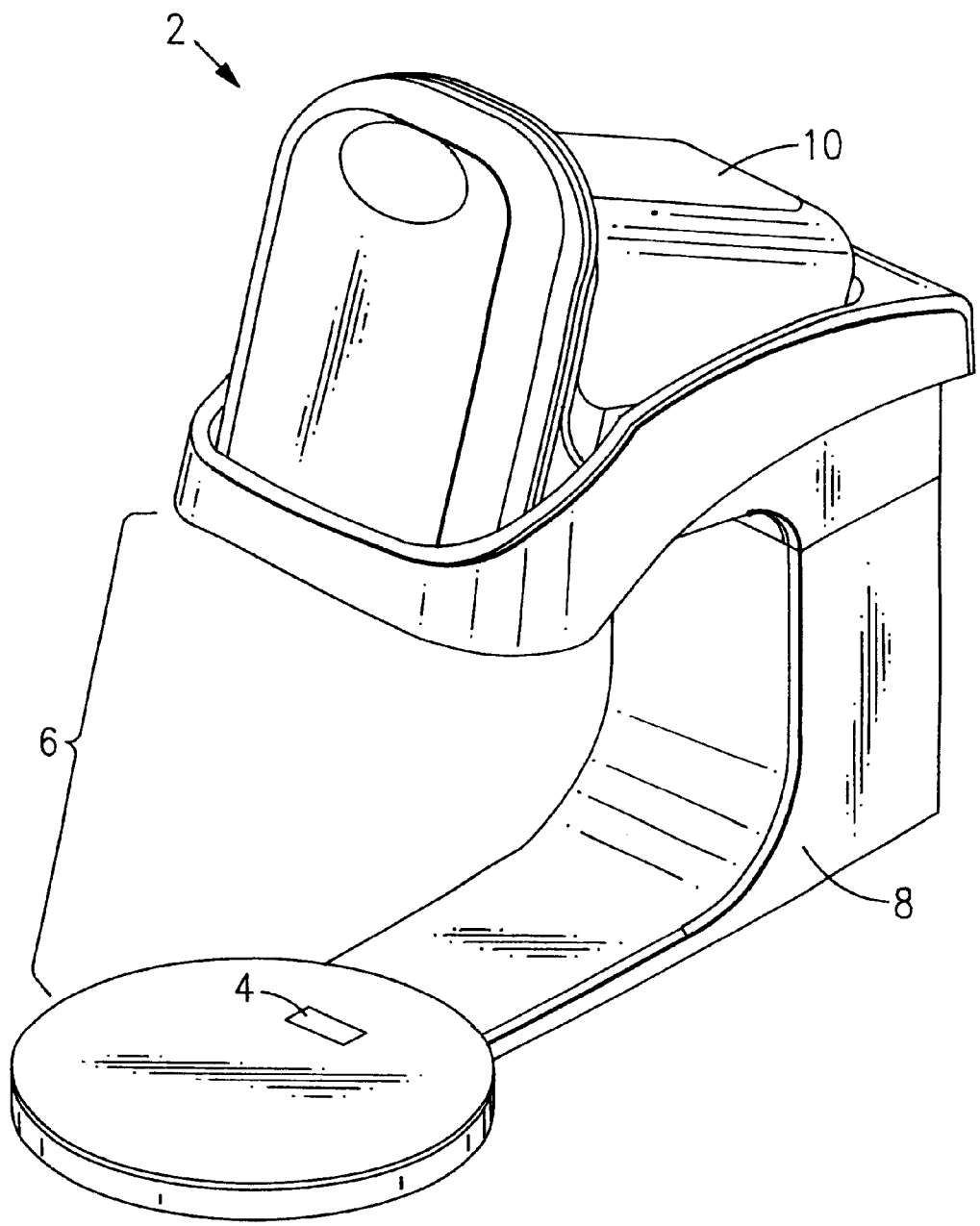
FIG. 1 shows a schematic diagram of the system of the invention comprising a stationary position optical reader and a detection light source.

A schematic diagram of the object detection system of the invention is shown in FIG. 1. System 2 includes a stationary position optical reader 10 and a detection light source 4 positioned opposite an imaging assembly of reader 10 so that the light source directs light toward the imaging assembly. In the specific embodiment of FIG. 1A, reader 10 is a provided by a hand held portable optical reader which is held in a stationary position in relation to symbol 4 by stand 8. A presentation area 6 is defined between the imaging assembly of reader 10 and the light source. When an object, such as a symbol-bearing substrate is presented to presentation area 6, the imaging assembly's view of the light source is blocked, thereby decreasing the amount of light received by the imaging assembly from the light source. Preferably, light source 4 is disposed slightly below the center of the field of view of the reader's imaging assembly from the perspective of reader 10 so that objects presented to system 2 are substantially in the field of view when their presence is detected. Light source 4 is preferably of a type that emits full scale radiance light rapidly in response to being supplied with power and is conveniently provided by an LED.

According to the invention, light generated by light source 4 is caused to be emitted according to a predetermined pattern, which pattern is readily detected in the case that no object is present in the presentation area. In the present invention the operating state of reader 10 is caused to change between active and inactive states depending on whether the light pattern of the light emitted by detection light source 4 is detected by reader 10.

Figure 2:
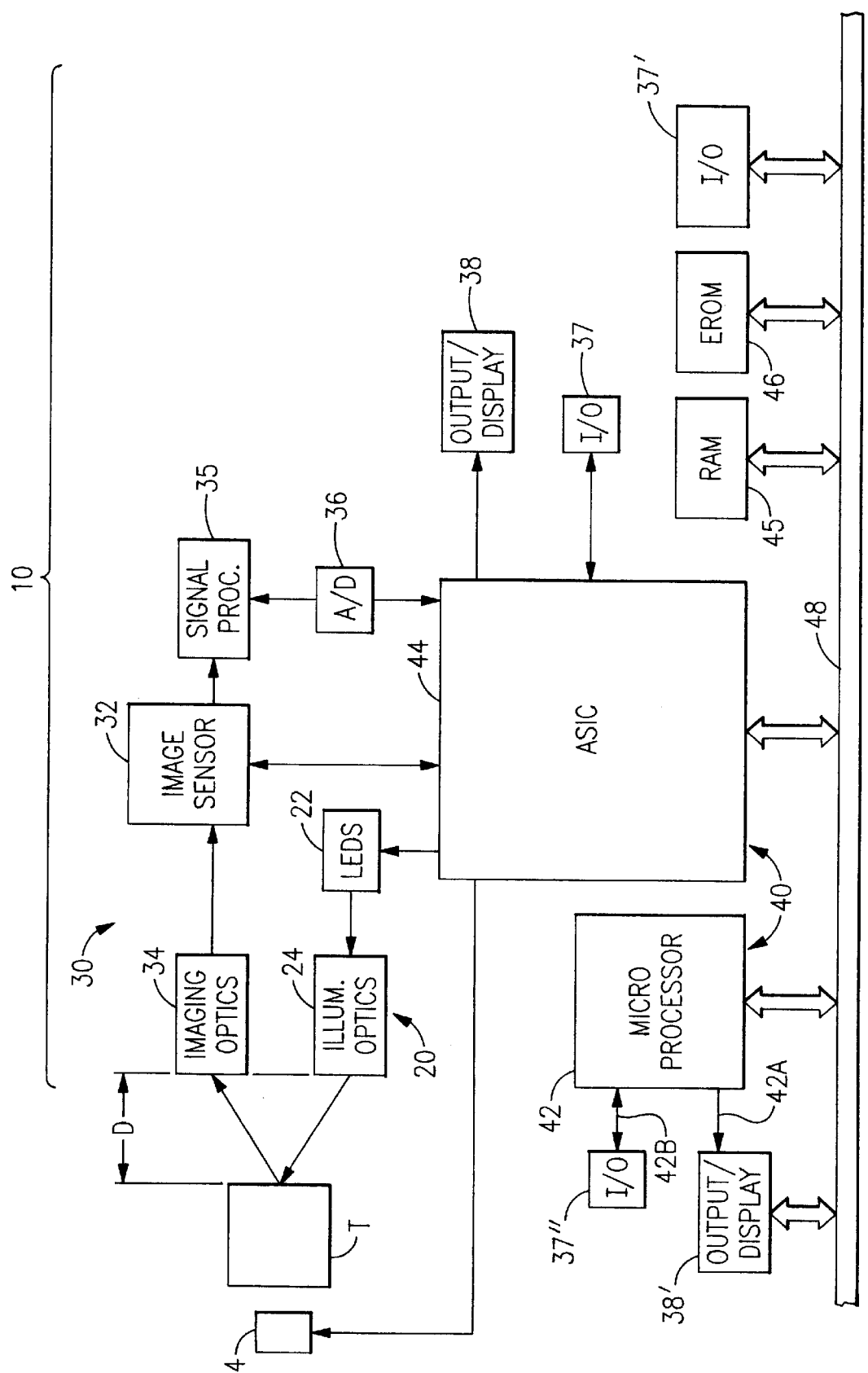
FIG. 2 illustrates a block diagram of an optical reader of a type which may be incorporated into the system of the invention.

A block diagram of an optical reader of a type which may be implemented in the system of the invention is shown in FIG. 2. Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2D CCD or CMOS solid state image sensor, together with an imaging optics assembly 34 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry.

Optical reader 10 of FIG. 2 also includes programmable controller 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, the A/D conversion process and the storage of image data, including the ability to access memories 45 and 46 via a DMA channel. Processor 44 may also perform many timing and communication operations. Processor 44 may, for example, control the illumination of LEDs 22, the activation of light source 4 of the system shown in FIG. 1, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37' and 38'. As explained earlier, the specifics of this division of labor is of no significance to the present invention.

Figure 3A:
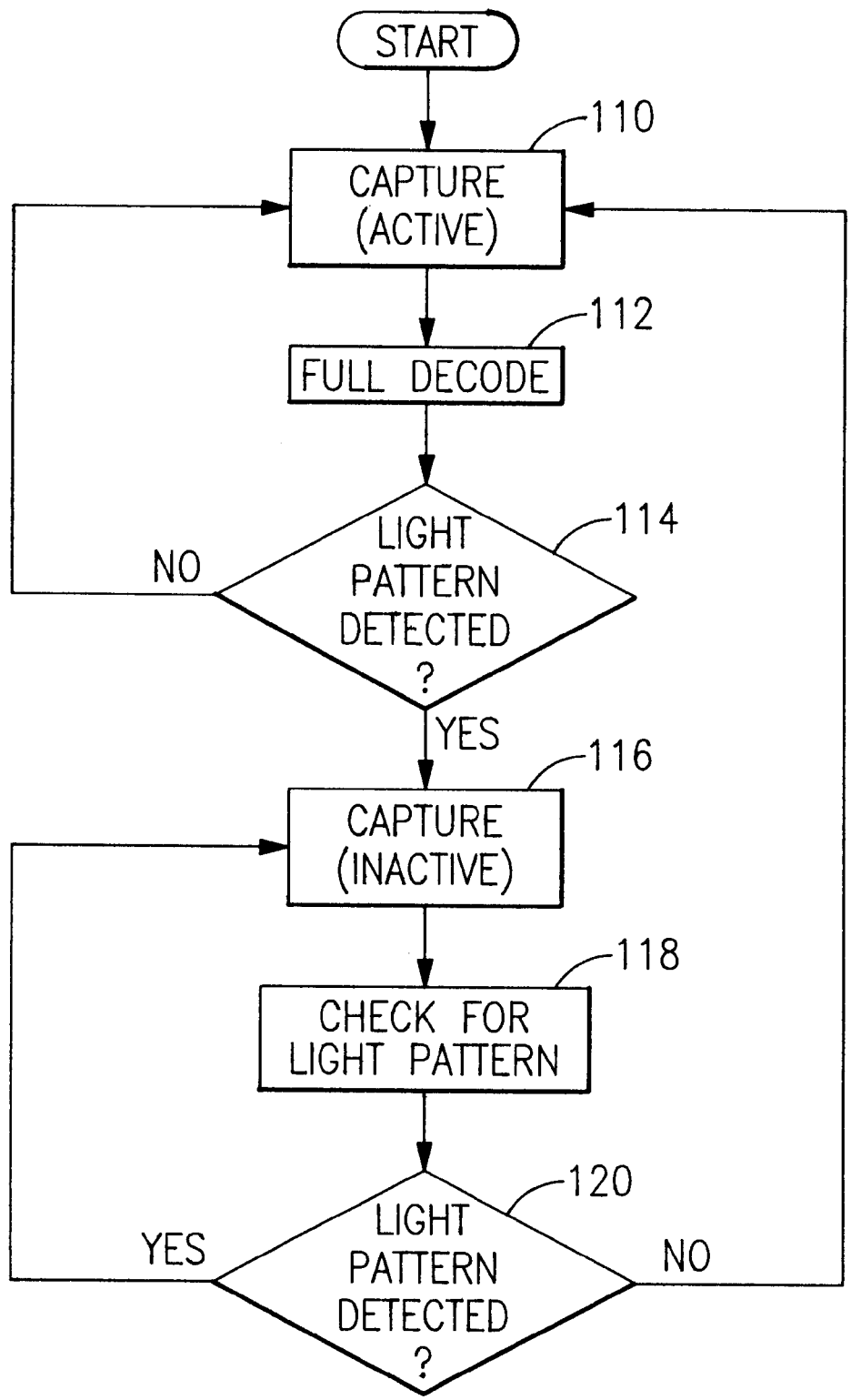
FIG. 3A is a flow diagram illustrating a possible sequence of operations executed by a reader configured according to the invention.

A flow diagram illustrating a sequence of operating steps of an optical reader configured in accordance with the invention is shown in FIG. 3A. After certain preliminary steps are executed involving initialization of reader hardware and defining memory address locations, controller 40 proceeds to block 110 and commences image capturing in an "active" operating state.

In the active operating state the reader operates in accordance with a conventional scanning operation. Particularly, the reader captures frames of bit map image data (Block 110) representing substantially an entire field of view of an imaging assembly, and from the image data attempts to decode (Block 112) any symbol which may be represented in a field of view. The image capturing is carried out utilizing a reader illumination source 22 configured to emit light at an illumination level of a standard radiance.

At block 114 reader 10 determines whether a light pattern emitted by light source 4 is detected. According to the invention, light source 4 is configured to emit light according to a predetermined pattern. The light pattern can be readily detected if there is no object in presentation area 6. Preferably, the pattern of light emitted by illumination source is coordinated with the image capturing carried out by controller 40. In one embodiment, light source 4 is configured to selectively emit light during alternating image data frame capture periods. That is, when controller 40 captures a first frame of image data, light source 4 is activated. When controller 40 captures a next frame of image data, light source is not activated, and so on. It is seen that if no object prevents light emitted from the light source from being received by imaging assembly, then the light pattern will be revealed in the image information generated by imaging assembly 30.

If controller 40 is configured to capture a gray scale bit map image of a scene, then determination of whether a light pattern is present can be made by detecting for alternating gray scale levels of certain pixel values or of average pixel values of groups of pixels in the bit map image. The detection of whether a light pattern is present can also be made by evaluating the analog signal waveform output by imaging assembly 30 for frame-by-frame fluctuations in voltage. The sensitivity of the light pattern detection can be adjusted so that conditions resulting in a partial blockage of light from light source, are registered either as blocked or unblocked conditions according to the discretion of the user.

If controller 40 determines at block 114 that the predetermined light pattern generated by light source 4 is present in the image information output by imaging assembly 30, then the condition is indicated that there is no object in the presentations area and reader is caused to change operating states to an inactive operating state (block 116).

In the inactive operating state, the reader operates according to a protocol that is different from the operating protocol in the active operating state. While the reader in the active state, in general, carries out full scale decoding, and attempts to decode any symbol which may be in the field of view of the imaging assembly, the essential function of the reader in the inactive operating state is to determine if a light detection pattern is present. Accordingly, a decoding algorithm does not have to be executed during the inactive operating state. Rather, the inactive operating state requires only that an a algorithm which detects for the presence of light pattern be carried out. As discussed previously with reference to the active operating state, such an algorithm may detect for the presence of a light pattern either by evaluating bit map image data corresponding to alternating frames of captured image date or by evaluating the analog signal waveform output by imaging assembly 30 for voltage fluctuations indicative of fluctuations in received light.

An important feature of the inactive operating state is that because additional light is not required to detect for the presence of a light pattern generated by light source 4 the reader illumination source (shown in FIG. 2 as an LED array 22) can be deactivated during execution of the inactive operating state. Accordingly, during the time that an object is not present in the presentation area, then the reader light source 22 does not continuously emit distracting high radiance light as in the case of a reader configured in a continuous scan mode. Light source 4 can satisfy its function of generating a detectable light pattern by generating significantly lower radiance light than that generated by reader illumination source 22 during full scale decoding active mode of operation, thereby reducing the total radiance of illumination emitted by the system 2 as compared to an optical reader system configured in a continuous scan mode.

Returning to the flow diagram of FIG. 3A it is seen that if after execution of the pattern verifier algorithm (block) 118 it is determined at block 120 that a light pattern is not present (indicating that an object such as a symbol-bearing substrate has been moved into the presentation area) that operation of reader 10 reverts to an active operating state (block 110).

Figure 3B:
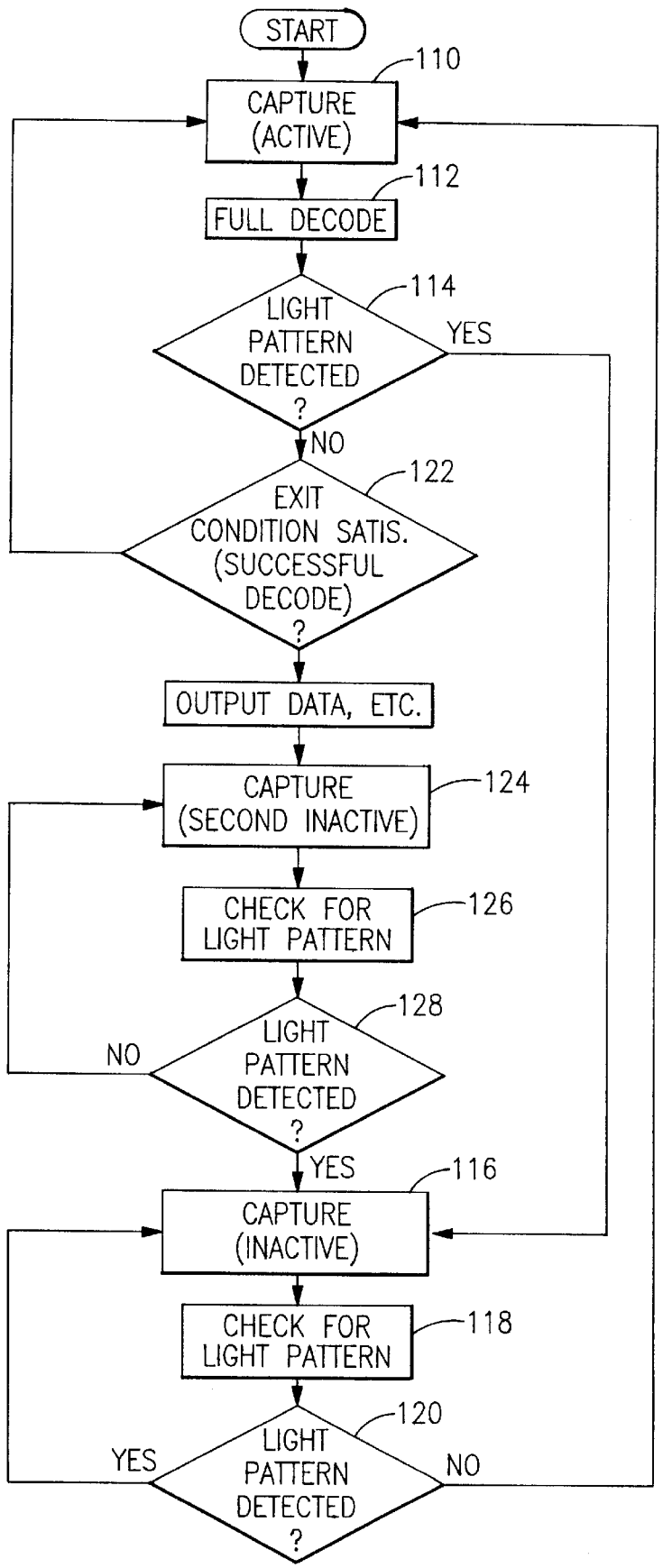
FIG. 3B is a flow diagram illustrating a possible sequence of operations executed by a reader configured according to an enhanced version of the invention.

A flow diagram illustrating an enhanced version of the invention is shown in FIG. 3B. In an enhanced version of the invention, reader 10 is caused to commence operation in a second inactive operating state under certain circumstances despite an object being in the field of view of imaging assembly 30.

Operating according to the method described in the flow diagram of FIG. 3B, a reader will cease full scale decoding and full scale illumination before an object is removed from a field of view if an exit condition is satisfied at block 122. One exit condition may be the successful decoding of a symbol. If a symbol is successfully decoded, it is normally unnecessary to continue operation of reader 10 utilizing full scale decoding and full scale reader illumination capabilities. Accordingly, if a symbol is successfully decoded, reader 10 may be caused to commence operating in a second inactive state (block 124). In other embodiments of the invention the exit condition of block 122 may be satisfied by, for example, a captured image being output for further processing. Such an exit condition may be useful in the case, for example, system 2 is used for general image capture and processing applications and not for the specific application of bar code decoding.

Operation of the reader in the second inactive state is similar to, and in some instances may be substantially the same as its operation in the inactive operating state. In the second inactive operating state, the reader need only execute a simple light pattern detection algorithm (block 126) and need not execute a full scale decoding algorithm. Further as in the inactive state, the reader's illumination source may be deenergized in the second inactive state. The only necessary distinction between the inactive and second inactive operating states is that while the inactive state is exited at block 120 when a light pattern is not detected (indicating the condition that an object has been presented to presentation area 6), the second inactive operating state is exited at block 128 when a light pattern is not detected (indicating the condition that an object has been removed from presentation area 6). When the exit condition of block 128 is satisfied reader commences operation in an inactive operating state (block 128).

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. A system for sensing the presence of an object, said system comprising:
    an optical reader including an imaging assembly for generating image information and a controller in communication with a memory space for controlling said imaging assembly;
    a light source controlled by said controller positioned to emit light in a field of view of said imaging assembly, wherein said controller controls an illumination level of said light source by controlling electrical current supplied to a light emitting element of said light source, wherein said controller is configured to capture frames of image data representing scenes defined by said field of view, wherein said controller controls said light source to define a predetermined light sequence characterized by said light source emitting light at different illumination levels during successive frame capture periods of said controller, wherein said controller is adapted to analyze image information developed during said successive frame capture periods to detect whether said predetermined light sequence is represented in said image information, and wherein an operating state of said reader depends on whether said controller detects said predetermined light sequence in said image information.

2. The system of claim 1, wherein said controller analyzes said image data of said captured frames of image data in detecting whether said predetermined light sequence is represented in said image information.

3. The system of claim 1, wherein said controller analyzes analog signal information output by said imaging assembly in detecting whether said predetermined light sequence is represented in said image information.

4. The system of claim 1, wherein said predetermined light sequence emitted by said light source is characterized by said light source being activated and subsequently deactivated in successive frame capture periods of said controller.

5. The system of claim 1, wherein said light source is positioned to direct light toward said imaging assembly so that an object located in a certain position within said field of view intermediate said illumination assembly and said light source prevents light emitted from said light source from being received by said imaging assembly.

6. A method for operating a stationary position type optical reader having an imaging assembly and a controller in communication with a memory, said imaging, assembly including an illumination source, said controller being configured to capture frames of image data into said memory, said method comprising the steps of:

providing a light source controlled by said controller to emit light in a field of view of said imaging assembly, wherein said controller controls an illumination level of said light source by controlling electrical current supplied to a light emitting element of said light source;

coordinating operation of said light source and said controller so that said light source emits light according to a predetermined light sequence characterized by said light source emitting light at a first illumination level when a first frame of image data is captured by said controller and at a second illumination level when a second frame of image data is captured by said controller;

in an active operating state, analyzing image information developed when said first and second frames of image data are captured to detect whether said predetermined light sequence is represented in image information generated by said imaging assembly; and switching operation of said reader to an inactive operating state when said predetermined light sequence is represented in said image information.

7. The method of claim 6, further comprising the step of deactivating an illumination source of said imaging assembly when said reader is switched to said inactive operating state.

8. The method of claim 6, wherein said detecting step includes the step of analyzing image data captured by said controller.

9. The method of claim 6, wherein said detecting step includes the step of analyzing analog signal information generated by said imaging assembly.

10. The method of claim 6, further comprising the step of altering operation of said reader to a second inactive state when an exit condition is satisfied and said predetermined light sequence is not represented in said image information.

11. The method of claim 6, wherein said coordinating step includes the step of activating and subsequently deactivating said light source during successive frame capture periods of said controller.

12. The method of claim 6, wherein said positioning step includes the step of locating said light source to direct light toward said imaging assembly so that an object located in a certain position within said field of view intermediate said illumination assembly and said light source prevents light emitted from said light source from being received by said imaging assembly.

13. A method for operating a stationary position type optical reader having an imaging assembly and a controller in communication with a memory, said controller being configured to capture frames of image data into said memory, said method comprising the steps of:

emitting light in a field of view of said imaging assembly according to a predetermined sequence characterized by said light source emitting light at a first illumination level when a first frame of image data is captured by said controller and at a second illumination level when a second frame of image data is captured by said controller, wherein said first and second illumination levels are controlled by controlling an amount of electrical current supplied to a light emitting element of a light source;

in an active operating state, analyzing image information developed over the course of capturing said first and second frames of image data to detecting whether said predetermined light sequence is represented in image information generated by said imaging assembly; and switching operation of said reader to an inactive operating state when said predetermined light sequence is represented in said image information.

14. The method of claim 13, wherein said detecting step includes the step of analyzing image data captured by said controller.

15. The method of claim 13, wherein said detecting step includes the step of analyzing analog signal information generated by said imaging assembly.

16. The method of claim 13, further comprising the step of altering operation of said reader to a second inactive state when an exit condition is satisfied and said predetermined light sequence is not represented in said image information.

17. The method of claim 13, wherein said coordinating step includes the step of activating and subsequently deactivating said light source during successive frame capture periods of said controller.

* * * * *